United States Patent [19]

Hamano et al.

[11] 4,194,140
[45] Mar. 18, 1980

[54] BEAM-INDEXING COLOR IMAGE-PRESENTATION CATHODE RAY TUBE

[75] Inventors: Eizaburo Hamano, Kumagaya; Tetsuo Komatsu, Fukaya, both of Japan

[73] Assignee: Tokyo Shibaura Electric Co., Ltd., Kawasaki, Japan

[21] Appl. No.: 889,507

[22] Filed: Mar. 23, 1978

[30] Foreign Application Priority Data

Mar. 28, 1977 [JP] Japan ................. 52/33342

[51] Int. Cl.² .................. H01J 29/32; H01J 31/20
[52] U.S. Cl. ........................ 313/471; 358/69
[58] Field of Search ................ 313/471; 358/69

[56] References Cited

U.S. PATENT DOCUMENTS

| 3,721,854 | 3/1973 | Sunstein | 315/375 |
| 3,767,954 | 10/1973 | Avoort | 313/471 |
| 4,003,082 | 1/1977 | Fumoto | 358/69 |

Primary Examiner—Robert Segal
Attorney, Agent, or Firm—Cushman, Darby & Cushman

[57] ABSTRACT

A beam-indexing color image-presentation cathode ray tube comprises color-phosphor stripes arranged in a regular order and differently responsive to impingement by electron beams to produce light of different colors and index-phosphor stripes arranged to have a predetermined geometric relation to the color-phosphor stripes and responsive to impingement by the electron beams to produce index signals, in which the index-phosphor stripes comprises a first index-phosphor stripe, a second index-phosphor stripe and a third index-phosphor stripe, the pitch of the second index-phosphor stripe is three times as large as the pitch of the third index-phosphor stripe, and the first index-phosphor stripe is wider in its width than the second index-phosphor stripe.

2 Claims, 4 Drawing Figures

BEAM-INDEXING COLOR IMAGE-PRESENTATION CATHODE RAY TUBE

BACKGROUND OF THE INVENTION

This invention relates to a beam-index type color image-presentation cathode ray tube.

An index color image-presentation cathode ray tube (hereinafter referred to as an index tube) is unprovided, unlike a shadow-mask tube, with a color switching and selecting electrode, and it is necessary in the index color image-presentation cathode ray tube to excite with electron beams those index-phosphor stripes on a metal-backed tricolor phosphor screen to emit a light, cause an index light signal so obtained to be converted through a transparent light-receiving window on an index tube funnel to an index signal by means of a photoelectric converting element on the outer surface of the funnel, detect the position of the electron beams on the fluorescent screen, and synchronize and modulate a chroma signal to obtain a color reproduction image.

Suppose that the triplet pitch of the color-phosphor stripes is $P_T$ and the pitch of the index-phosphor stripes is $P_I$. When in this case a color reproduction is effected in an index tube whose $P_T/P_I$ ratio is a non-integral number (normally $P_T/P_I=3/2$ or $\frac{1}{2}$), several starting index strips are arranged on the electron beam scan starting side of the index phosphor stripes to obtain a starting reference signal (so-called "starting signal) for taking a color synchronization uniformly at each scan starting time; the starting index-phosphor stripes are excited by scanning with electron beams to emit an index signal light; the light is converted through the photoelectric converting element to an electric index signal; and a corresponding pulse is counted so as to obtain a color synchronization. The pitch of the starting index-phosphor stripes is usually three times the pitch $P_I$ of the index stripes i.e. the running index stripes, and the stripe width is substantially $P_I/2$.

If the triplet pitch $P_T$ becomes small in order to reproduce a fine image, the pitch of the starting index-phosphor stripes naturally becomes small with the result that the stripe width becomes small. For a 20-inch index tube, for example, $P_I$ becomes 0.6 mm at $P_T=0.9$ and the width of the starting index-phosphor stripes is about 0.9 mm. When a color synchronization is taken using this method, the pulse number of the starting signals is required to be accurately counted. Suppose that an error resulting from, for example, the variation of high voltage and the non-linearity of the deflecting yoke is several % varied momentarily. Then, an erroneous operation will be involved and consequently color synchronization could not be obtained. Thus, a complicated compensation circuit will be required.

If in the index tube any residue etc. of the index phosphor is present in the neighborhood of the starting index phosphor, an unwanted pulse is generated, causing an erroneous operation of the counter circuit and thus failing to effect a normal color reproduction. In order to eliminate undesired pulses a light-impervious film such as graphite and carbon is partially attached by vapor evaporation, or coated, near to the starting index-phosphor.

FIG. 1 is an enlarged cross-sectional view showing a screen structure of a conventional index tube. In this Figure is shown a cross-section when a screen section corresponding to a beginning of the horizontal scanning period is cut in a direction of scanning of electron beams. Reference numerals 1 and 2 show index-phosphor stripes and the index-phosphor stripes 1 in particular show starting index-phosphor stripes. Reference numeral 3 is a metal film, such as aluminium, which serves as a metal back. Reference numeral 4 is a light-impervious material and reference numeral 5 is an arrangement of tri-color (red, green and blue) phosphor stripes. Reference numeral 6 is a face plate. An arrow 7 indicates a direction in which electronic beams come and an arrow 8 indicates a direction in which electron beam scanning is effected. 1A shows the undesired residue of index-phosphor etc. FIG. 3 shows a relation of a color step-out or out of color-synchronization, a cause for defects, resulting from such residue of the undesired index-phosphor. That is, FIG. 3 shows a manner in which, when a color reproduction is effected using a circuit of FIG. 2, the gate ON time after time period $T_1$ from a horizontal synchronizing pulse of a counter circuit 14 varies relative to the position of each phosphor of the index tube owing to the high voltage variation or the non-linearity of a deflecting yoke. This means that no normal pulse number can be obtained at the counter circuit 14 of FIG. 2. This leads to a color stepout. FIG. 3(A) shows the output waveform of a photoelectric-converting element 9 and FIG. 3(B), the waveforms of a starting index signal which correspond to outputs passing through frequency selection circuits 10 and 12 and waveform shaping circuits 11 and 13. The signal has a predetermined relation to the horizontal synchronizing pulse and it is adapted to be counted by the counter circuit 14 which is operated for a time period $T_2$ after delay time period $T_1$ from the horizontal synchronizing pulse. When the horizontal synchronizing pulse leads or lags due to the above-mentioned voltage variation and the non-linearity of the deflecting yoke, count errors occur as shown in FIGS. 3(C) and 3(D), causing a color step-out.

In FIG. 2, numeral 15 shows a horizontal synchronizing circuit; numeral 16, a pulse gate circuit; numeral 17, a frequency converting circuit; numeral 18, a phase correction circuit; numeral 19, a color gate circuit; numeral 20, a color mixing circuit, and numeral 21, an index tube.

SUMMARY OF THE INVENTION

It is accordingly an object of this invention to provide a beam-indexing type color-representation color cathode ray tube in which a color synchronization starting signal is obtained stably and accurately.

According to this invention there is provided a beam-indexing type color image-presentation cathode ray tube comprising color-phosphor stripes arranged in a regular order and differently responsive to impingement by electron beams to produce light of different colors and index-phosphor stripes arranged to have a predetermined geometric relation to the color-phosphor stripes and responsive to impingement by the electron beam to produce index signals, in which the index-phosphor stripes comprises a first index-phosphor stripe, a second index-phosphor stripe and a third index-phosphor stripe, the pitch of the second index-phosphor stripe is three times as large as the pitch of the third index-phosphor stripe and the first index-phosphor stripe are wider in its width than the second index-phosphor stripe.

BRIEF DESCRIPTION OF THE DRAWINGS

This invention will now be described by way of example with reference to the accompanying drawings, in which.

DETAILED DESCRIPTION OF THE PREFERRED EMBODIMENTS

The embodiment of this invention will now be explained below by referring to the accompanying drawings.

Figure 1:
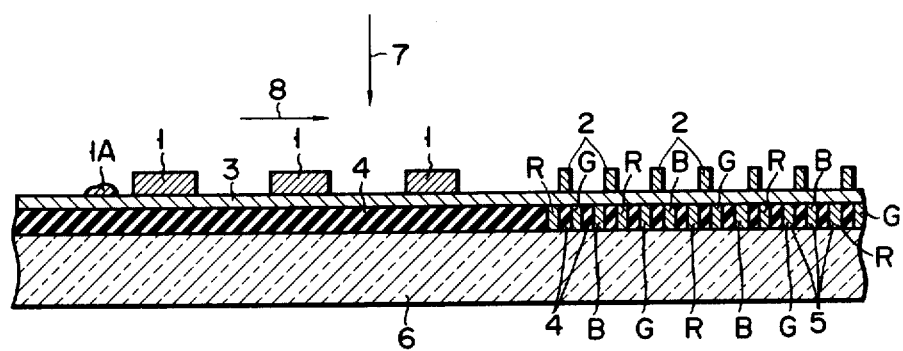
FIG. 1 is an enlarged cross-sectional view showing a major part of a conventional index color cathode ray tube in which a ratio between the triplet pitch ($P_T$) of color-phosphor stripes and the pitch ($P_I$) of index-phosphor stripes is a non-integral number.
Figure 2:
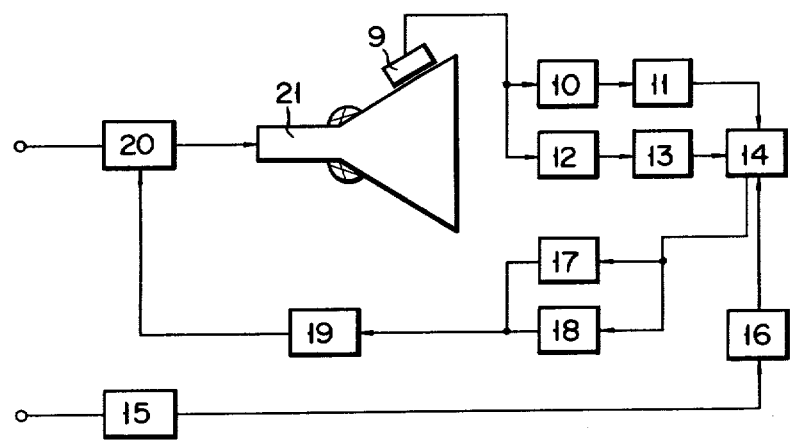
FIG. 2 is a block diagram showing a circuit of a color television receiver having a beam-indexing color cathode ray tube.
Figure 3:
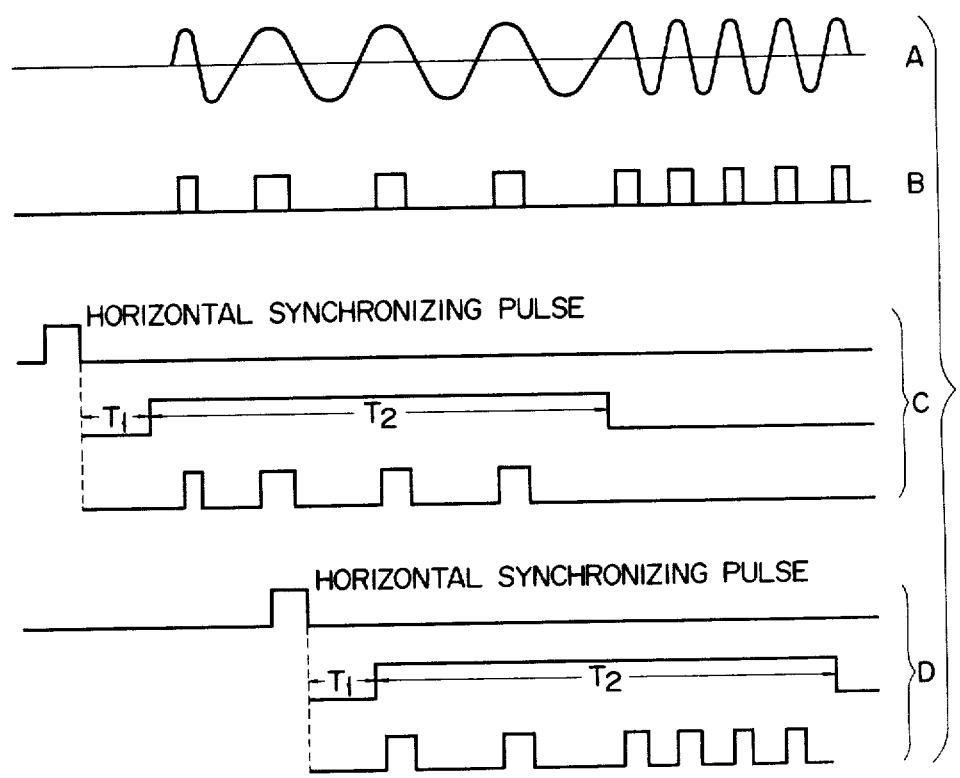
FIG. 3 is waveform diagrams showing the operation of the conventional beam-indexing color cathode ray tube shown in FIG. 1.
Figure 4:
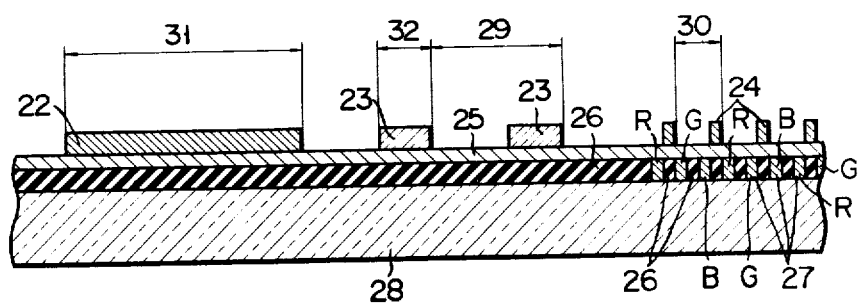
FIG. 4 is an enlarged cross-sectional view showing a major part of the phosphor screen of a beam-indexing color cathode ray tube according to this invention.

FIG. 4 is an enlarged cross-sectional view showing a major part of a screen structure of an indexing color cathode ray tube according to this invention. As shown in FIG. 4 index-phosphor stripes comprise a first index-phosphor stripe 22, second index-phosphor stripes 23 and third index-phosphor stripes 24, in which a pitch 29 of the second index-phosphor stripes 23 is three times as large as the pitch 30 of the third index-phosphor stripes 24 and a width 31 of the first index-phosphor stripe 22 is wider than a width 32 of the second index-phosphor stripes 23. The first and second index-phosphor stripes function as what is called "starting index stripes" and the third index-phosphor stripes as "running index stripes". The above-mentioned arrangement can eliminate defects as encountered in the prior art color CRT. That is, even when a relative positional relation of the horizontal synchronizing pulse to the phosphor varies due to the variation of high voltage or the non-linearity of the deflection yoke i.e. a gate ON time (in which a gate circuit for counting a second index starting signal is opened) is varied due to the phosphor, if the above-mentioned gate ON time is sufficiently stably determined on the first index-phosphor stripe, a color synchronization can be taken irrespective of the above-mentioned variation, thereby permitting a color reproduction to be effected.

The width 31 of the first index-phosphor stripe 22 depends on a circuit design made with respect to the high voltage variation of the index tube. In this case, however, the width of the first index-phosphor stripe 22 may be about two times the width 32 of the second index-phosphor stripes 23. Even in the manufacture of the index tube there is no need of any cumbersome step of, for example, covering the residue etc. with any light-impervious film. A mere convenient method is used to broaden the width 31 of the first index-phosphor stripe, permitting a realization of a color image-presentation cathode ray tube whose color synchronization is stable over the whole viewing screen.

Although, in the above-mentioned beam-indexing color image-presentation cathode ray tube according to this invention, one first index-phosphor stripe 31 is provided, as shown in FIG. 4, in the neighborhood of an effective viewing screen surface of the face plate, it may be provided on the skirt portion of the face plate (in this case, the over-scanning of electron beams is utilized). In the alternative method, a plurality of first index-phosphor stripes may be provided.

What we claim is:

1. A beam-indexing color image-presentation cathode-ray tube comprising color-phosphor stripes arranged in a regular order and differently responsive to impingement by electron beams to produce light of different colors and index-phosphor stripes arranged in a predetermined geometric relation to the color-phosphor stripes and responsive to impingement by the electron beam to produce index signals, in which said index-phosphor stripes comprise a first index-phosphor stripe, a second index-phosphor stripe and a third index-phosphor stripe, the pitch of the second index-phosphor stripe being three times as large as the pitch of said third index-phosphor stripe, and the width of the first index-phosphor stripe being about twice that of the second index-phosphor stripe.

2. A beam-indexing color image-presentation cathode-ray tube according to claim 1, in which the first index-phosphor stripe is twice the width of the second index-phosphor stripe.

* * * * *